(12) United States Patent
Behm

(10) Patent No.: US 7,874,153 B2
(45) Date of Patent: Jan. 25, 2011

(54) HYDROSTATIC DRIVE AND METHOD OF BRAKING A HYDROSTATIC DRIVE

(75) Inventor: Martin Behm, Ulm (DE)

(73) Assignee: Bosch Rexroth AG, Stuttgart (DE)

( * ) Notice: Subject to any disclaimer, the term of this patent is extended or adjusted under 35 U.S.C. 154(b) by 387 days.

(21) Appl. No.: 12/065,686

(22) PCT Filed: Dec. 15, 2006

(86) PCT No.: PCT/EP2006/012126

§ 371 (c)(1),
(2), (4) Date: Mar. 4, 2008

(87) PCT Pub. No.: WO2007/073892

PCT Pub. Date: Jul. 5, 2007

(65) Prior Publication Data

US 2008/0190103 A1    Aug. 14, 2008

(30) Foreign Application Priority Data

Dec. 16, 2005 (DE) .................... 10 2005 060 341
Oct. 11, 2006 (DE) .................... 10 2006 048 198

(51) Int. Cl.
*F16H 39/00* (2006.01)
*B60K 17/10* (2006.01)
(52) U.S. Cl. ................. 60/464; 60/490; 60/492
(58) Field of Classification Search .......... 60/464, 60/490, 491, 492
See application file for complete search history.

(56) References Cited

U.S. PATENT DOCUMENTS

| 4,679,396 | A | * | 7/1987 | Heggie | .......... | 60/490 |
| 5,390,759 | A | * | 2/1995 | Gollner | .......... | 180/307 |
| 6,135,580 | A | * | 10/2000 | Denning | .......... | 60/436 |
| 6,339,928 | B1 | * | 1/2002 | Gollner | .......... | 60/464 |

FOREIGN PATENT DOCUMENTS

| DE | 31 49 473 A1 | 7/1982 |
| DE | 42 34 826 C1 | 10/1993 |
| DE | 42 26 453 A1 | 2/1994 |
| WO | WO 97/33782 | 9/1997 |
| WO | WO 2006/066759 A2 | 6/2006 |

* cited by examiner

*Primary Examiner*—Thomas E Lazo
(74) *Attorney, Agent, or Firm*—Scully, Scott, Murphy & Presser, P.C.

(57) ABSTRACT

The invention relates to a hydrostatic drive (1) and to a method of braking a hydrostatic drive (1). In the hydrostatic drive (1), in a closed circuit a hydraulic pump (3) is connected by a first and a second working line (11, 12) to a hydraulic motor (4). The hydrostatic drive (1) comprises a brake actuation device (37) as well as at least one pressure relief valve (26, 30), which is connected to the working line disposed downstream of the hydraulic motor (4). The hydraulic pump (3) upon detection of an actuation of the brake actuation device (37) is adjustable to a braking delivery rate. The hydraulic motor (4) is adjusted in dependence upon the actuating intensity of the brake actuation device (37) in the direction of a larger absorption volume if the actuating intensity of the brake actuation device (37) increases.

11 Claims, 3 Drawing Sheets

HYDROSTATIC DRIVE AND METHOD OF BRAKING A HYDROSTATIC DRIVE

BACKGROUND

The invention relates to a method of braking a hydrostatic drive and to such a hydrostatic drive.

Hydrostatic drives are often used to drive the hydraulic systems for implement operation or the vehicle drive systems in construction site vehicles. In this case, a primary drive source, for example an internal combustion engine, is connected to at least one hydraulic pump. For driving the vehicle, a hydraulic motor is mostly connected to this hydraulic pump in the closed circuit. Because of the mass inertia of the vehicle, during braking of the vehicle the hydraulic motor, which is then driven by the vehicle wheels, acts as a pump and without reversing the direction of flow delivers pressure medium in the closed hydraulic circuit. The hydraulic pump, which is therefore loaded with the pressure medium at its suction side, accordingly acts as a hydraulic motor and generates an output torque, which counteracts the internal combustion engine.

In vehicles travelling at low speed, such as for example forklift trucks, the hydrostatic transmission of the vehicle drive system is often also used to brake the vehicle. For this purpose, it is known for the hydraulic pump to counteract the internal combustion engine. The brake power thereby achievable is limited by the available brake power of the internal combustion engine. From DE 198 92 039 A1 it is further known to connect a second, variable displacement hydraulic pump to the pump shaft. This second, variable displacement hydraulic pump is disposed in an open circuit and designed for delivery in one direction only. The pressure medium delivered by the second, variable displacement hydraulic pump may in the event of a braking operation be relieved via a pressure relief valve back into the tank volume. The volumetric flow towards the pressure relief valve is in this case limited by means of a valve, which with progressive actuation of a brake pedal supplies an increasing volumetric flow to the pressure relief valve.

The drawback of the described drive system is that, in addition to the hydraulic pump and the hydraulic motor and the respective drive circuits thereof, a further hydraulic pump is needed to generate a braking effect. Besides the adjustment of the hydraulic pump and the hydraulic motor of the hydrostatic transmission, it is therefore additionally necessary to adjust the delivery rate of the further hydraulic pump. What is more, the delivery flow of the additional hydraulic pump that is relieved via the pressure relief valve has to be regulated by means of an adjustable valve. The braking operation therefore involves not only the vehicle drive system but also the open circuit needed for the actuation of hydraulic systems for implement operation.

SUMMARY

The underlying object of the invention is to provide a hydrostatic drive and a method of braking a hydrostatic drive, which allow a braking operation to be carried out exclusively by means of the elements disposed in a closed hydraulic circuit.

The object is achieved by means of the hydrostatic drive according to the invention and by means of the method according to the invention having the features according to claim 1 and claim 8 respectively.

The hydrostatic drive according to the invention comprises a hydraulic pump in a closed circuit. In the closed circuit a hydraulic motor is connected by a first and a second working line of the closed circuit to the hydraulic pump. The hydrostatic drive further comprises a brake actuation device and at least one pressure relief valve, which is connected to the working line disposed downstream of the hydraulic motor. Upon actuation of the brake actuation device, the hydraulic pump is adjustable to a braking delivery rate. The hydraulic motor is adjustable in dependence upon an actuating intensity of the brake actuation device with increasing actuating intensity in the direction of a larger absorption volume. The braking delivery rate in this case is so selected that at least some of the pressure medium, which is delivered by the hydraulic motor acting as a pump during coasting-down, is relieved through the pressure relief valve. In this case, kinetic energy that has to be reduced is converted into heat. A simple solution arises when the braking delivery rate corresponds to a zero stroke of the hydraulic pump. An extra hydraulic pump is not necessary for such a braking operation. It is moreover advantageously possible for pressure relief valves, which are used to protect the working line of the closed circuit of the hydrostatic drive, to be used during the braking operation.

According to the advantageous method according to the invention, in such a drive first an actuation of a brake actuation device is detected. Owing to the detected actuation of the brake actuation device, the hydraulic pump is adjusted to a braking delivery rate. The absorption volume of the hydraulic motor is then set in dependence upon an actuating intensity of the brake actuation device to a corresponding absorption volume, wherein the hydraulic motor is adjusted with increasing actuating intensity in the direction of a larger absorption volume. The pressure medium, which the hydraulic motor delivers into the working line connected to it downstream, is relieved via the pressure relief valve.

Advantageous implementations of the hydrostatic drive and of the method according to the invention are represented in the sub-claims.

In particular, it is advantageous if the hydraulic motor initially upon actuation of the brake actuation device is adjusted to a reduced or disappearing delivery rate and, starting from this position, is swivelled out again in the direction of a larger absorption volume. The adjustment of the hydraulic motor to an initially reduced or disappearing absorption volume has the advantage of preventing pressure peaks in the hydrostatic closed circuit.

In order additionally to utilize the braking effect of a drive motor connected to the hydraulic pump, it is advantageous if the braking delivery rate is so selected that the hydraulic pump with a displacement different from zero counteracts the drive motor. Thus, some of the kinetic energy that is to be reduced is reduced by counteracting the drive motor and the rest of the energy is reduced by conversion to heat at the pressure relief valve. Given this delivery rate different from zero, preferably the power consumed by the hydraulic pump at opening pressure of the pressure relief valve is identical with the brake line [sic] of the drive motor connected to the hydraulic motor. Thus, advantageous use is made of the fact that a braking effect may be achieved also by the hydraulic pump counteracting the drive motor. The adjustment of the braking delivery rate to a delivery rate value corresponding to the available brake power of the drive motor in this case offers the possibility of optimum utilization of the brake line [sic] made available by the drive motor. This reduces the heat generated at the pressure relief valve, which need convert to heat only the kinetic energy going beyond this.

The hydraulic motor is preferably adjusted to an absorption volume proportional to the intensity of the actuation of the brake actuation device. Such a proportional adjustment of the absorption volume of the hydraulic motor has the advantage of producing a calculable braking effect for a user of a vehicle driven by the hydrostatic drive according to the invention. If, for example, as an actuating intensity the force on a brake pedal is measured, then the adjustment of the hydraulic motor is effected in proportion to the brake force summoned up by the user. Such a proportional adjustment of the hydraulic motor facilitates operation.

In order to be able to utilize the function of the hydrostatic drive and/or or the method of braking a hydrostatic drive in an identical manner in both directions of travel, preferably in a simple hydrostatic drive having a delivery in one of the two working lines it is advantageous to provide one pressure relief valve each for both of the working lines of the closed circuit. It is therefore possible, independently of a selected direction of travel and hence of the associated direction of flow of the pressure medium in the closed circuit, to achieve a braking effect also independently of the direction of travel.

BRIEF DESCRIPTION OF THE DRAWINGS

An advantageous embodiment of the hydrostatic drive according to the invention and of the method of braking a hydrostatic drive is represented in the drawings. The drawings show.

DETAILED DESCRIPTION OF EXEMPLARY EMBODIMENTS

Figure 1:
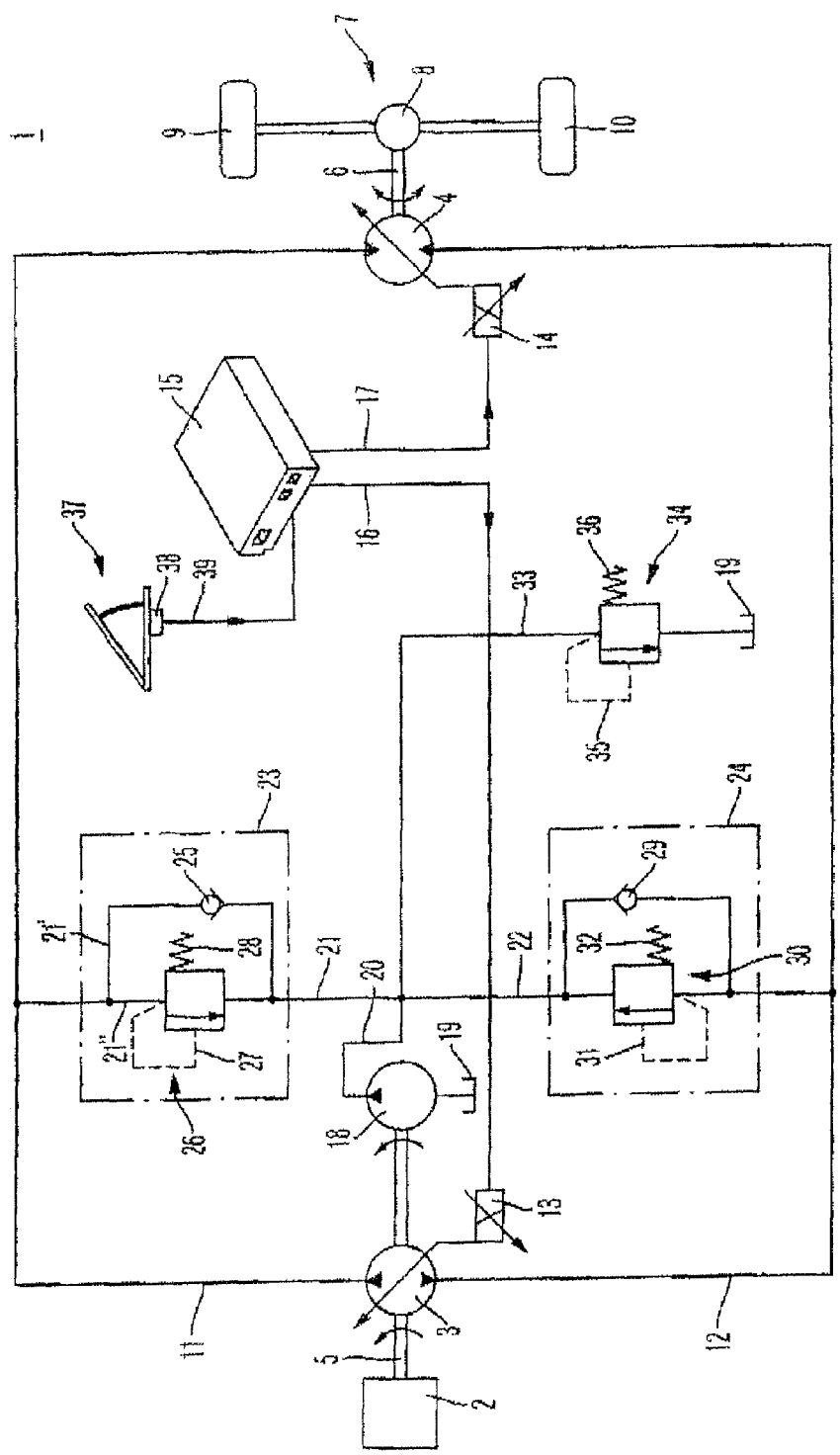
FIG. 1 a diagrammatic representation of a hydrostatic drive according to the invention.

A hydrostatic drive according to the invention is represented in FIG. 1. As a primary drive source a drive motor 2 is used, which generally takes the form of an internal combustion engine, preferably a diesel internal combustion engine. The hydrostatic drive 1 according to the invention may be for example a hydrostatic transmission of the hydrostatically driven vehicle, such as for example a forklift truck or construction machinery, but is not limited to such a drive.

The drive motor 2 drives a variable displacement hydraulic pump 3. The variable displacement hydraulic pump 3 is designed for delivery in two directions and is preferably an axial piston machine of an inclined-axis or swash-plate design. Connected to the hydraulic pump 3 in a closed circuit is a hydraulic motor 4. The hydraulic motor 4 is likewise designed for operation in both directions of flow. The absorption volume of the hydraulic motor 4 is likewise adjustable.

In order to drive the hydraulic pump 3, the drive motor 2 is connected by a drive shaft 5 to the hydraulic pump 3. The hydraulic motor 4 is connected by an output shaft 6 to, for example, a driven axle 7 of a construction machine. This comprises an axle differential that transmits the input torque, which is supplied via the output shaft 6, to the wheels 9, 10 of the vehicle.

The hydraulic pump 3 delivers into a first working line 11 or a second working line 12. The hydraulic pump 3 is connected by the first working line 11 and the second working line 12 to the hydraulic motor 4 in a closed circuit. There therefore arises, in dependence upon the direction of delivery of the hydraulic pump 3, a clockwise or anticlockwise direction of flow in the representation of FIG. 1. The different directions of delivery in this case correspond to forward and reverse motion.

The direction of delivery and the delivery rate of the hydraulic pump 3 are adjusted preferably by means of a first adjusting device 13. Given the use of an axial piston machine of a swash-plate design as hydraulic pump 3, the adjusting device 13 actuates an adjusting mechanism of the hydraulic pump 3, for example a swash plate disposed in a rocking cradle.

In a comparable manner a second adjusting device 14 is provided, which interacts with the adjusting mechanism of the hydraulic motor 4. As hydraulic motor 4, variable displacement hydraulic machines may be used. The hydraulic motor 4 might be, for example, a hydrostatic axial piston machine of an inclined-axis or swash-plate design.

The adjustment of the delivery rate of the hydraulic pump 3 and of the absorption volume of the hydraulic motor 4 is defined by means of an electronic control unit 15. The electronic control unit 15 is connected by a first control signal line 16 to the first adjusting device 13 and by a second control signal line 17 to the second adjusting device 14. During normal travel, the transmission ratio of the hydrostatic transmission is defined by the electronic control unit 15. The hydrostatic transmission comprises the closed circuit and the hydraulic motor 4 and the hydraulic pump 3 disposed therein. By defining the delivery rate of the hydraulic pump 3 and the absorption volume of the hydraulic motor 4, the transmission ratio of the hydrostatic transmission is determined. The input variable used in this case is, for example, a position of a vehicle pedal, which is not represented in FIG. 1.

A feed pump 18 is connected to the drive shaft 5 as well as to the hydraulic pump 3. The feed pump 18 takes the form of a fixed displacement pump and is provided for delivery in one direction only. The feed pump 18, as a result of its fixed connection to the input shaft 5, rotates at the rotational speed of the drive motor 2.

The feed pump 18 takes in pressure medium from a tank volume 19 and delivers it in accordance with the rotational speed of the input shaft 5 into a feed line 20. The feed line 20 opens out into a first connection line 21 and a second connection line 22. The first connection line 21 connects the feed line 20 to the first working line 11. The second connection line 22 connects the feed line 20 in a corresponding manner to the second working line 12.

In the first connection line 21 a first feed valve unit 23 is provided. In a corresponding manner, a second feed valve unit 24 is provided also in the second connection line.

The feed valve units 23 and 24 are used together with the feed pump 18 to maintain a system pressure and to fill the hydraulic circuit from the—during the starting phase—initially unpressurized state thereof. For this purpose, the first feed valve unit 23 comprises a first non-return valve 25 in a first connection line branch 21'. The non-return valve 25 opens in the direction of the first working line 11. Parallel to the first non-return valve 25, a first pressure relief valve 26 is disposed in a second connection line branch 21". If the feed pressure prevailing in the feed line 20 exceeds the pressure of the first working line 11, the first non-return valve 25 opens and pressure medium flows out of the feed line 20, through the first connection line 21, the first connection line branch 21' thereof and the non-return valve 25 disposed therein into the first working line 11. If, on the other hand, the working pressure prevailing in the first working line 11 is higher than the feed pressure in the feed line 20, the non-return valve 25 changes over into its closed position and blocks the first connection line branch 21'.

In the second connection line branch 21", while normal working pressures arise, the first pressure relief valve 26 is in its closed position. The first pressure relief valve 26 is loaded in the direction of its closed position by a first compression spring 28. Acting in the opposite direction to the force of the first compression spring 28 via a first measuring line 27 is the pressure prevailing in the second connection line branch 21". The pressure prevailing in the second connection line branch 21" is identical with the pressure in the first working line 11. The pressure prevailing in the second connection line branch 21" is transmitted to a corresponding measuring surface of the first pressure relief valve 26 through the first measuring line 27.

If the pressure in the first working line 11 exceeds a critical value that is defined by the first compression spring 28, then the hydraulic force at the measuring surface, which is loaded with the working line pressure through the first measuring line 27, also exceeds the force of the first compression spring 28. Consequently, the first pressure relief valve 26 is adjusted in the direction of its open position. The pressure in the first working line 11 may therefore be relieved via the second connection line branch 21" in the open state of the first pressure relief valve 26 in the direction of the feed line 20.

The second feed valve unit 24 is of a corresponding construction. It comprises a second non-return valve 29 in a third connection line branch 22' of the second connection line that opens in the direction of the second working line 12. The second non-return valve 29 opens if the pressure in the feed line 20 exceeds the pressure in the second working line 12. Provided parallel to the second non-return valve 29 is a second pressure relief valve 30 in a fourth connection line branch 22". The second pressure relief valve 30 opens if a hydraulic force, which is generated at a measuring surface by a pressure supplied through a second measuring line 31, exceeds the force of a second compression spring 32 acting in the opposite direction. The second compression spring 32 loads the second pressure relief valve 30 in the direction of its closed position.

If the first working line 11 is relieved via the first pressure relief valve 26 in the direction of the feed line 20 and if the feed pressure prevailing in the feed line 20 is higher than the pressure in the second working line 12, then the second non-return valve 29 opens and the first working line 11 is relieved in the direction of the second working line 12.

For protecting the feed line 20 and the feed valve units 23 and 24, a feed pressure relief valve 34 is provided. The feed pressure relief valve 34 is connected by a relief line 33 to the feed line 20 and the connection lines 21 and 22. The feed pressure relief valve 34 is likewise a pressure relief valve loaded by a spring 36. Acting in the opposite direction to the force of the spring 36 is a hydraulic force, which is generated by a pressure that is removed through a third measuring line 35 of the relief line 33. If the pressure prevailing in the feed line 20 and/or the connection lines 21, 22 exceeds the maximum feed pressure defined by the spring 36, then the feed pressure relief valve 34 is adjusted in the direction of its open position and the relief line 33 is relieved into a tank volume 19.

For the following description of a braking operation it is assumed that there is initially a driving situation, in which the hydraulic pump 3 delivers into the first working line 11. The direction of flow in FIG. 1 is therefore in clockwise direction. The first working line 11 is the—in relation to the hydraulic pump 3—delivery-side working line and is disposed upstream of the hydraulic motor 4. The second working line 12 is accordingly, given delivery in clockwise direction, disposed downstream of the hydraulic motor 4 and forms the suction-side working line of the hydraulic pump 3. Given a reversal of the direction of travel, the delivery- and suction sides as well as the direction of flow are reversed.

For detecting a braking operation a brake pedal 37 is provided. The brake pedal 37 is connected to a sensor 38, which upon actuation of the brake pedal 37 transmits a signal via a signal line 39 to the electronic control unit 15. The brake pedal 37 in the illustrated embodiment forms a brake actuation device. If the brake pedal 37 is then actuated, a braking operation is detected owing to the signal of the sensor 38 the actuation [sic] and an intensity of actuation of the brake pedal 37 is detected by the sensor 38. The sensor 38 may be an angle-, distance- or force-measuring device and may accordingly detect an actuating travel or an actuating force of the brake pedal 37. The signal corresponding to this actuating intensity is transmitted via a signal line 39 to the electronic control unit 15.

As soon as the electronic control unit 15 detects that a braking operation exists, the first adjusting device 13 and the second adjusting device 14 receive corresponding control signals. The first adjusting device 13 of the hydraulic pump 3 is set to a braking delivery rate by means of a corresponding hydraulic-pump control signal through the first control signal line 16. In the simplest case, the braking delivery rate is a disappearing delivery rate of the hydraulic pump 3, with the result that a flow through the hydraulic pump 3 is impossible.

Preferably the hydraulic motor 4 is initially upon detection of the start of a braking operation by virtue of a corresponding motor control signal adjusted by means of the second adjusting device 14 to a reduced or disappearing absorption volume. Starting from this position of the hydraulic motor 4, in the case of an axial piston machine of a swash-plate design, the swash plate is swivelled out again and therefore increases the absorption volume of the hydraulic motor 4, wherein the swivel angle increases with increasing actuating intensity of the brake actuation device. The actuating intensity is detected either as a distance, angle or force upon the brake pedal 37. The adjustment of the hydraulic motor 4 is effected in such a way that the direction of flow into the closed circuit is retained. With increasing actuating intensity of the brake actuation device, the hydraulic motor 4 therefore, given an unaltered direction of flow, acts increasingly as a pump and delivers pressure medium into the downstream working line. In the previously described embodiment, in which in the closed circuit pressure medium is delivered in clockwise direction, the hydraulic motor 4 accordingly delivers into the second working line 12 that is connected to it downstream. The greater the actuating intensity, the greater the pressure medium flow that is generated by the hydraulic motor 4 in the direction of the hydraulic pump 3.

As already stated, in the simplest case the braking delivery rate, to which the hydraulic pump 3 is adjusted, is a zero delivery rate. Accordingly, the pressure medium delivered into the second working line 12 cannot flow through the hydraulic pump 3. A pressure rise in the second working line 12 is the result. If the pressure in the second working line 12 exceeds a pressure value defined by the second pressure relief valve 30, the second pressure relief valve 30 opens and relieves the second working line 12 in the direction of the feed line 20.

At the same time, the pressure in the first working line 11 drops. The pressure drop occurs as a result of the intake of pressure medium by the hydraulic motor 4 from the first working line 11. A follow-up delivery of pressure medium by the hydraulic pump 3 cannot occur because the braking delivery rate has been adjusted to zero. The pressure in the feed pressure line 20 therefore exceeds the pressure prevailing in the first working line 11 and the first non-return valve 25 opens. Through the second pressure relief valve 30 of the second feed valve unit 24 and through the non-return valve 25 of the first feed valve unit 23 the pressure that has built up in the second working line 12 is relieved into the first working line 11 with simultaneous generation of heat at the second pressure relief valve 30. The kinetic energy is therefore converted to heat at the second pressure relief valve 30.

According to a preferred implementation, the adjustment of the absorption volume of the hydraulic motor 4 is effected in proportion to the actuating intensity of the brake actuation device. Instead of the illustrated brake pedal 37, the brake actuation device may for example comprise a suitable hand lever. It is further advantageous for the braking delivery rate of the hydraulic pump 3 not to be designed as a zero delivery rate. If the available brake power of the drive motor 2 is to be utilized, then a braking delivery rate of the hydraulic pump 3 that is different from zero is set. The braking delivery rate is ideally so dimensioned that at the opening pressure of the second pressure relief valve 30 the available brake power of the drive motor 2 is not exceeded and so no critical increase of the rotational speed of the drive motor 2 occurs.

This is the case when the hydraulic power consumed by the hydraulic pump 3 corresponds to the brake power of the drive motor 2.

In order to allow an adjustment of the braking effect that is pleasant for the user, the adjustment of the absorption volume of the hydraulic motor 4 is preferably proportional to the actuating intensity of the brake pedal 37. The adjustment of the hydraulic pump 3 to its braking delivery rate and the adjustment of the hydraulic motor 4 upon detection of the braking operation to a disappearing absorption volume are advantageously effected simultaneously. In this case, it is particularly advantageous to take into account the natural swivelling behaviour of the pump and the motor. If the hydraulic pump 3 is adjusted to a braking delivery rate that is different from zero, then preferably in this case too an adjustment to a zero delivery rate is initially effected.

The representation of FIG. 1 shows a simple embodiment having only one hydraulic motor 4. The invention may of course be extended to the use of a plurality of hydraulic motors 4, wherein the hydraulic motors are actuated by a common adjusting device or by separate adjusting devices. To achieve a braking effect, one or more of the provided hydraulic motors is adjusted in the previously described manner.

Figure 2:
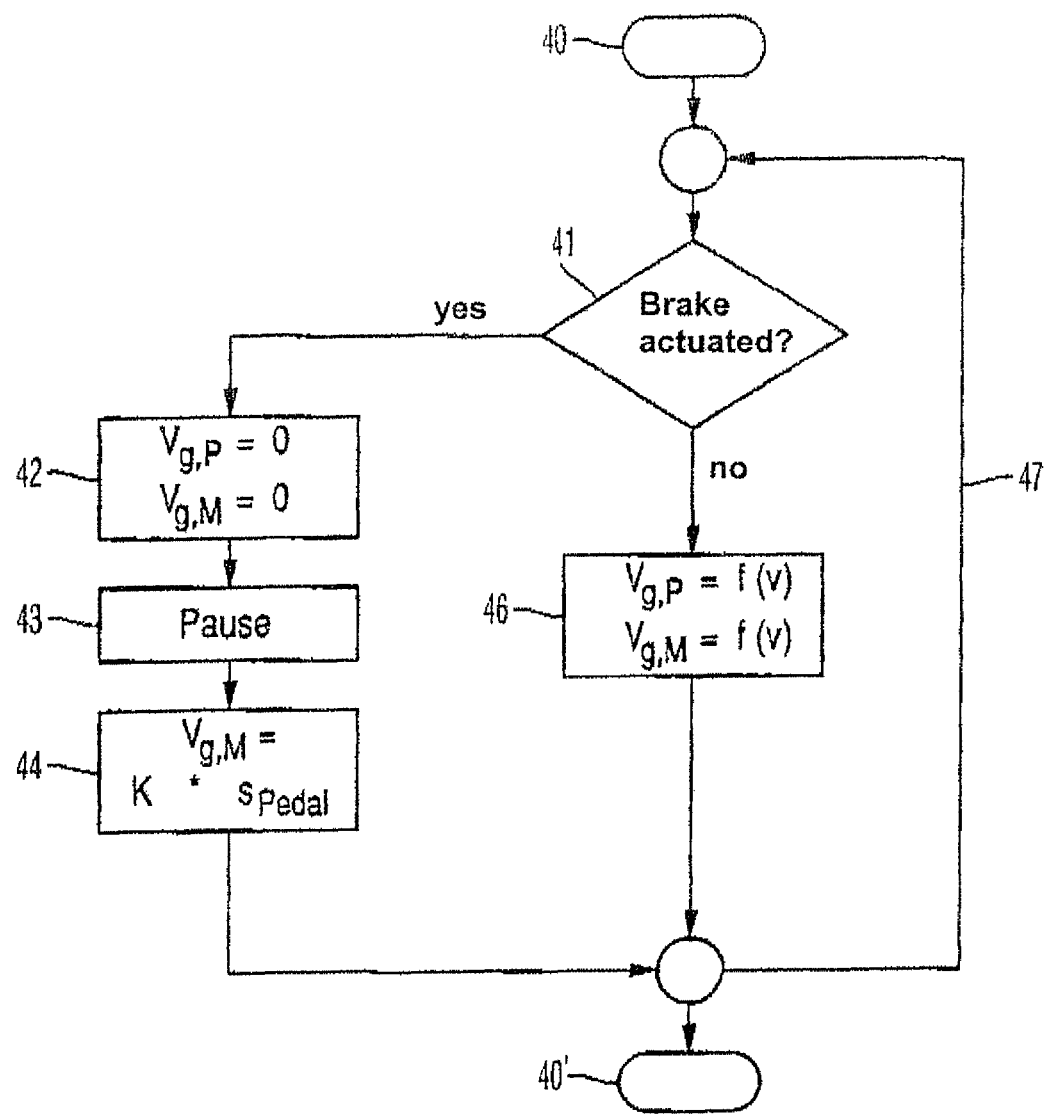
FIG. 2 a simplified representation of a first method sequence.

In FIG. 2 an example of a first method sequence is diagrammatically represented. Starting from a normal operating state 40, the electronic control unit 15 inquires whether a signal is being transmitted by the brake actuation device. If the electronic control unit 15 receives such a signal, then a braking operation is detected and in step 42 the delivery rate of the hydraulic pump is adjusted to a braking delivery rate $V_{gP}$. At the same time, the absorption volume of the hydraulic motor 4 $V_{gM}$ is swivelled to zero. The simultaneous adjustment to a zero delivery rate and a zero absorption volume may prevent the occurrence of pressure peaks in the closed hydraulic system. The adjustment to a zero absorption volume and a zero delivery rate is followed by a short pause. The purpose of the pause 43 after the fastest possible reduction of the absorption volume and the delivery rate is to ensure a stable system state before, in step 44, the absorption volume of the hydraulic motor 4 is adjusted to an absorption volume proportional to the actuating intensity of the brake actuation device and the hydraulic pump 3 is adjusted to the braking delivery rate. In the course of the further braking operation the absorption volume of the hydraulic motor 4 is adapted to the respective actual actuating intensity.

The inquiry regarding the existence of a braking operation is effected cyclically, for which reason according to the arrow 47 of FIG. 2 there is a return jump to the start of the method.

If the result of the inquiry in step 41 is that a braking operation no longer exists, then in step 46 the delivery rate of the hydraulic pump 3 and the absorption volume of the hydraulic motor 4 are adjusted back to a value corresponding to the normal driving mode. This adaptation is undertaken likewise by the electronic control unit 15, which adjusts the transmission ratio of the hydrostatic transmission, as already indicated, in dependence upon a vehicle pedal position or a vehicle lever position. The hydrostatic drive 1 is therefore situated once more in its original driving state at varied speed 40'.

Figure 3:
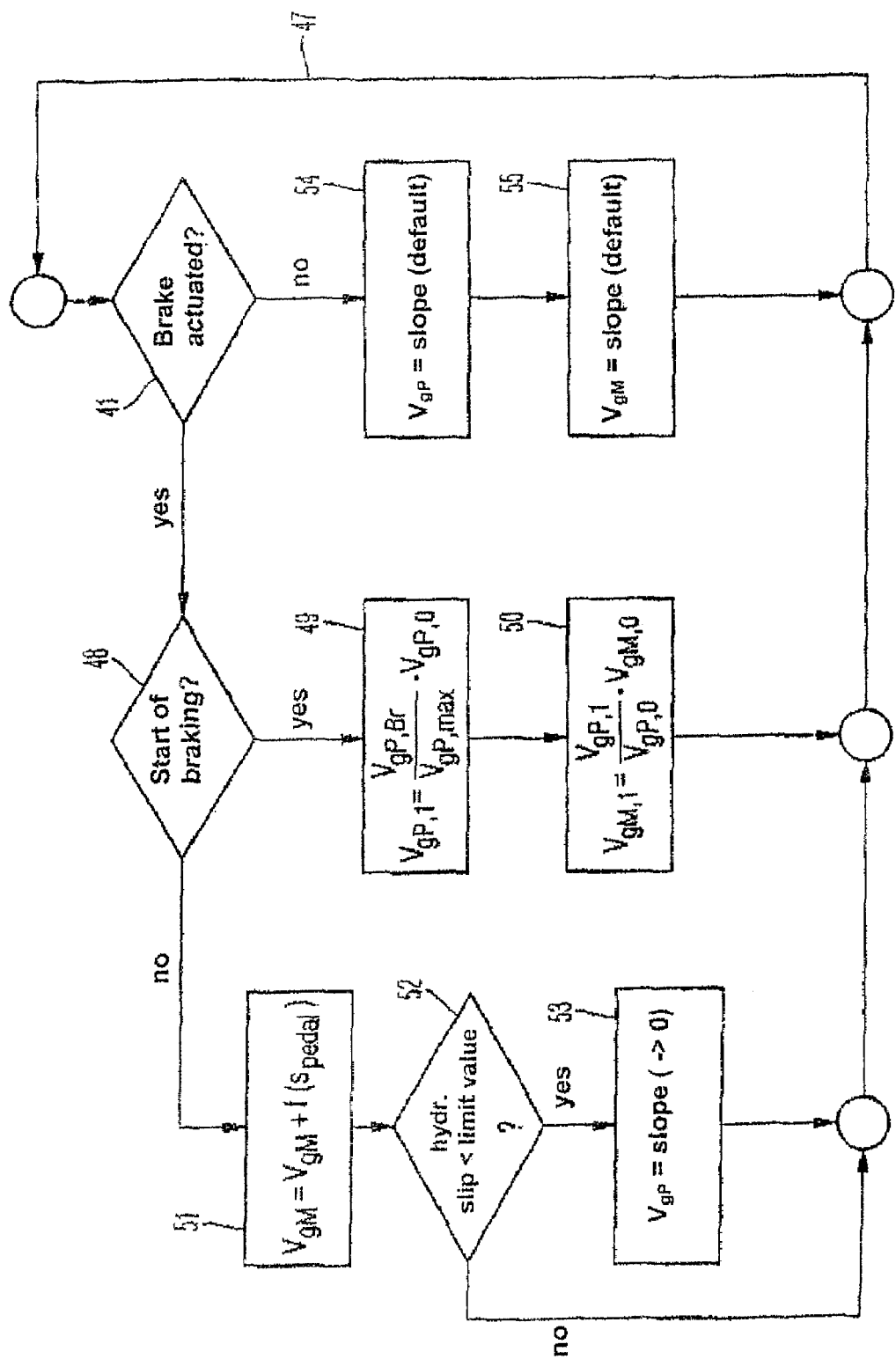
FIG. 3 a simplified representation of a second method sequence.

An alternative, particularly preferred embodiment of the sequence of the method during braking is represented in FIG. 3.

Starting from the normal driving mode, first in step 41 the electronic control unit 15 inquires whether the brake actuation device is transmitting a signal. In step 41, therefore, given the existence of a corresponding signal an actuation of the brake pedal 37 is detected. If the control unit 15 detects the actuation of the brake, then in step 48 it is determined whether the braking operation has already begun or whether from an accelerated or continuous driving mode a deceleration of the vehicle is occurring. For this purpose, a comparison is made with a preceding value and in this way it is established whether the signal is being freshly transmitted by the brake actuation device.

If a start of a braking operation is thereby established, the method sequence branches off to step 49. In the method steps 49 and 50 following the establishment of the start of a braking operation, both the hydraulic pump 3 and the hydraulic motor 4 are adjusted in the direction of a decreasing delivery rate and absorption volume respectively. Starting from the original adjustment of the delivery rate of the hydraulic pump $V_{gP,0}$, the hydraulic pump 3 is adjusted to a reduced value $V_{gP,1}$, which is proportional to the ratio of braking delivery rate $V_{gP,Br}$ to $V_{gP,max}$:

$$V_{gP,1} = \frac{V_{gP,Br}}{V_{gP,max}} \cdot V_{gP,0}$$

At the same time, the hydraulic motor 4 is adjusted to a reduced absorption volume $V_{gM,1}$. The reduced absorption volume $V_{gM,1}$ is in this case so selected that the transmission ratio of the hydrostatic drive 1 remains constant. Starting from the original absorption volume $V_{gM,0}$, the hydraulic motor 4 is therefore adjusted to the new absorption volume $V_{gM,1}$ in accordance with the following relationship:

$$V_{gM,1} = \frac{V_{gP,1}}{V_{gP,0}} \cdot V_{gM,0}$$

The adjustment of the delivery rate of the hydraulic pump 3 and of the absorption volume of the hydraulic motor 4 is an integral part of a method sequence, in which the method steps 41 and 48 are also executed repeatedly.

Consequently, after the hydraulic motor 4 and the hydraulic pump 3 have been set to their reduced delivery rate $V_{gp,1}$ and absorption volume $V_{gM,1}$ respectively, the inquiry whether the brake actuation device has been actuated is repeated. If a deceleration is still desired, then the actuating device is consequently actuated continuously so that upon the next inquiry in step 48 it is established that a start of braking does not exist.

Thus, a continuing braking operation is established and in step 51 the absorption volume of the hydraulic motor is adjusted in dependence upon the actuation of the brake actuation device to an up-dated absorption volume. The extent of the adjustment in this case is dependent upon the actuation of the brake actuation device.

It is then checked in step 52 whether with the up-dated absorption volume $V_{gP}$ of the hydraulic motor 4 a limit value for a hydraulic slip has been reached, from which the hydraulic pump may be swivelled over a possible time slope to zero, thereby allowing the vehicle to be decelerated to a standstill.

If the established slip is lower than the limit value, then in step 53 the delivery rate of the hydraulic pump 3 is adjusted along a slope in the direction of a disappearing delivery rate.

If, on the other hand, it is established in step 52 that the slip limit has been reached, an adjustment of the delivery rate of the hydraulic pump 3 does not occur and there is a branching-off to the starting point of the method sequence according to the arrow 47.

During the braking operation the method steps 51, 52 and possibly 53 are continuously repeated. At the end of the braking operation, upon the renewed inquiry whether the brake actuation device has been actuated, it is established in step 41 that the actuation device is no longer actuated by the user. Accordingly, along a slope in step 54 the delivery rate $V_{gP}$ of the hydraulic pump 3 is adjusted back to a default value. At the same time or with a time stagger relative thereto, the absorption volume of the hydraulic motor 4 $V_{gM}$ is also adjusted along a slope to a default value in step 55. The default values in this case correspond to a transmission ratio of the drive 1 that is adapted to the new driving situation.

In the preferred method sequence represented in FIG. 3, a zero swivelling of the hydraulic motor 4 is not required. Thus, for the drive for implementing the method sequence according to the second example it is also possible to use motors that are not adjustable to a disappearing absorption volume.

The invention is not limited to the represented embodiments. Rather, combinations of individual options and modifications are also possible without departing from the inventive idea.

The invention claimed is:

1. A hydrostatic drive comprising:
  a hydraulic pump;
  a hydraulic motor, which is connected to the hydraulic pump in the closed circuit by a first working line and a second working line;
  a brake actuation device; and
  at least one pressure relief valve, which is connected to one of the first working line and the second working line disposed downstream of the hydraulic motor, the at least one pressure relief valve being configured to open at a defined pressure value;
  wherein the hydraulic pump upon actuation of the brake actuation device is adjustable to a braking delivery rate and the hydraulic motor is adjustable in dependence upon an actuating intensity of the brake actuation device with increasing actuating intensity in the direction of a larger absorption volume; and
  the braking delivery rate of the hydraulic pump is a delivery rate different from zero, at which the hydraulic power at an opening pressure of the pressure relief valve corresponds to an available brake power of a drive motor.

2. The hydrostatic drive according to claim 1, wherein the hydraulic motor upon actuation of the brake actuation device is adjustable initially to a reduced or disappearing delivery rate and, subsequently, in the direction of a larger absorption volume.

3. The hydrostatic drive according to claim 1, wherein the hydraulic motor is adjustable to an absorption volume that is proportional to the actuating intensity of the brake actuation device.

4. The hydrostatic drive according to claim 1, further comprising an additional pressure relief valve connected to the other working line.

5. The hydrostatic drive according to claim 1, further comprising an electronic control unit for adjusting the braking delivery rate of the hydraulic pump and the absorption volume of the hydraulic motor, to which a braking signal reproducing the actuating intensity of the actuation device may be supplied.

6. The hydrostatic drive according to claim 1, wherein the at least one pressure relief valve is disposed in a feed valve unit.

7. A method of braking a hydrostatic drive comprising a hydraulic pump and a hydraulic motor connected thereto in the closed circuit and at least one pressure relief valve, which is connected to a working line disposed downstream of the hydraulic motor, the at least one pressure relief valve being configured to open at a defined pressure value, comprising the following steps:
  detecting an actuation of a brake actuation device;
  adjusting braking delivery rate of the hydraulic pump;
  adjusting the hydraulic motor in dependence upon an increasing actuating intensity of a brake actuation device in the direction of a larger absorption volume; and
  relieving a brake pressure, which prevails in the working line disposed downstream of the hydraulic motor, via the pressure relief valve;
  wherein upon actuation of the brake actuation device the hydraulic pump is adjusted to a braking delivery rate different from zero, at which the hydraulic power consumed at opening pressure of the pressure relief valve corresponds to an available brake power of a drive motor.

8. The method of braking a hydrostatic drive according to claim 7, wherein prior to adjusting the absorption volume of the hydraulic motor in dependence upon the actuating intensity of the brake actuation device, the hydraulic motor upon detection of a braking operation is adjusted initially to a reduced or disappearing absorption volume.

9. The method of braking a hydrostatic drive according to claim 7, wherein the hydraulic motor is adjusted to an absorption volume that is proportional to the actuating intensity of the brake actuation device.

10. The method of braking a hydrostatic drive according to claim 7, wherein a signal reproducing the actuating intensity of the brake actuation device is supplied to an electronic control unit and the braking delivery rate of the hydraulic pump and the absorption volume of the hydraulic motor are adjusted by means of the electronic control unit.

11. The method according to claim 7, wherein the pressure prevailing in the working line disposed downstream of the hydraulic motor is relieved into a feed line via a pressure relief valve disposed in a feed valve unit.

* * * * *